3,304,347
UNSATURATED POLYESTER PREPARED FROM BIS(HYDROXYALKYLENEOXYCARBONYL)BENZENES
Charles W. McGary, Jr., South Charleston, Percy L. Smith, Dunbar, and Lowell R. Comstock, South Charleston, W. Va., assignors to Union Carbide Corporation, a corporation of New York
No Drawing. Filed Apr. 6, 1964, Ser. No. 357,749
6 Claims. (Cl. 260—861)

The invention relates to an improvement in the art of polyesters of dihydric alcohols and dicarboxylic acids. In a particular aspect, the invention relates to polyesters that are prepared from bis(hydroxyalkyleneoxycarbonyl)benzenes and olefinically unsaturated dicarboxylic acid, and to hard, infusible products prepared by copolymerizing said polyesters with a vinyl monomer such as styrene.

The bis(hydroxyalkyleneoxycarbonyl)benzenes that are employed in the invention are compositions that can be represented by Formula I:

(I)
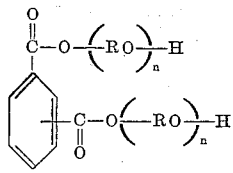

wherein each $n$ individually is a number having a value of at least 1 and can be as high as 10 or more, and wherein each R individually represents a divalent, saturated hydrocarbon group of from 2 to 4 carbon atoms. Preferably, $n$ is a number having an average value of from about 1.5 to about 2.5.

The bis(hydroxyalkyleneoxycarbonyl)benzene employed in the invention can be produced by reacting a phthalic acid or phthalic anhydride under controlled conditions with an alkylene oxide, an alkylene glycol, a dialkylene glycol, or the like. The reactants and the conditions employed are selected to produce the desired bis-(hydroxyalkyleneoxycarbonyl)benzene, rather than polymerization to a polyester, as is explained more fully below.

The reaction conditions and reactants employed depend upon whether phthalic anhydride or a phthalic acid such as ortho-, meta- or para-phthalic acid is employed.

When starting with phthalic anhydride, the preferred method is to first react a 1:1 molar ratio of phthalic anhydride with alkylene glycol. The reaction can be carried out by heating a mixture of the reactants to 50°–160° C., and preferably, 100°–140° C. for about 1 to 2 hours. Temperatures in excess of 160° C. will lead to water formation by reaction of hydroxyl with carboxylic acid, and therefore should be avoided as this will lead to polyester formation. The desired product of the reaction of phthalic anhydride and alkylene glycol is mono-(hydroxyalkyl) phthalate, and further condensation (i.e., water formation by the reaction mentioned above) is not desired. The known hydroxylanhydride catalysts such as tertiary amines can be employed if desired, but are not preferred. The second step is to react the mono(hydroxyalkyl) phthalate with an alkylene oxide. It is preferred to carry out this reaction without a catalyst in a pressure vessel of the type conventionally employed for alkylene oxide addition reactions. The temperature can vary from about 25° C. to 160° C., and is preferably in the range of 100° C. to 130° C. The pressure can be atmospheric or superatmospheric up to 60 p.s.i. or more. The amount of oxide employed is determined by several factors. If no catalyst is employed, a 10 to 50 weight percent excess is preferably employed over the amount calculated to yield an oxyalkylene chain length of up to about 1.9–2.1 (cf., the variable $n$ in Formula I above). If an acidic or basic catalyst is employed, the alkylene oxide is employed in the amount calculated to yield the desired oxyalkylene chain length. The reaction is normally carried out by charging the mono(hydroxyalkyl) phthalate to the pressure vessel, heating to reaction temperature (preferably 100° C.–130° C.), and then slowly adding the alkylene oxide at a rate such that the pressure does not exceed about 60 p.s.i. When all the oxide has been added, an additional reaction period of, e.g., 1 to 2 hours at 100° C.–130° C. is desirable. At the completion of the reaction, excess oxide (if any) can be removed by vacuum distillation. Of course, inert solvents such as toluene can be employed, but they are not necessary and so are usually avoided for economic reasons.

In the case where the starting material is one or more of the phthalic acids, the acid is preferably reacted with alkylene oxide. It is preferred to carry out this reaction in a convetnional pressure vessel without a catalyst. Under these conditions, it is desirable to add about 1.6–1.8 moles of alkylene oxide per acid equivalent, and a slight excess (i.e., 10 to 50 weight percent) is preferably employed. When a catalyst is employed (e.g., stannous octoate, potassium hydroxide, or the like), the exact amount of oxide is employed that is calculated to yield the desired oxyalkylene chain length. The reaction conditions for this oxide addition are essentially the same as the conditions employed for adding alkylene oxide to mono(hydroxyalkyl) phthalate, described above.

Th alkylene glycols and alkylene oxides that can be employed in the above-described reactions are preferably those which have from 2 to 4 carbon atoms such as ethylene glycol, 1,2-propylene glycol, 1,3-propylene glycol, 1,2-, 1,3-, 1,4-, and 2,3-butylene glycol, isobutylene glycol, ethylene oxide, 1,2-propylene oxide, 1,2-butylene oxide, 2,3-butylene oxide, isobutylene oxide, and the like.

The bis(hydroxyalkyleneoxycarbonyl)benzene is then reacted with an olefinically unsaturated acid or anhydride. Maleic anhydride is preferred, although many others can be employed such as fumaric acid, maleic acid, tetrahydrophthalic acid or anhydride, bicyclo[2.2.1]hept-2-ene 5,6-dicarboxylic acid or anhydride, or the like. The olefinically unsaturated dicarboxylic acid can have up to, for instance, 10 carbon atoms. This esterification reaction between the dicarboxylic acid and bis(hydroxyalkyleneoxycarbonyl)benzene is preferably conducted without a catalyst, although catalysts such as p-toluenesulfonic acid can be employed if desired. The bis(hydroxyalkyleneoxycarbonyl)benzene and dicarboxylic acid or anhydride can be employed in about stoichiometric amounts, although it is preferred to employ a slight excess (i.e., 5–10 percent by weight) of the acid reactant. In some cases, it may be desirable to employ additional alkylene glycol along with the bis(hydroxyalkyleneoxycarbonyl)benzene when reacting with the dicarboxylic acid or anhydride. In such cases, a slight excess (e.g., 5–10 weight percent) of glycol is preferably employed. The esterification is carried out at elevated temperatures above 160° C. and preferably at 200°–220° C. A small amount of an azeotroping agent such as xylene can be employed if desired. A standard reaction vessel equipped with heating means, agitator, nitrogen inlet means, means for separating the water of condensation, and the like, can be employed. The esterification reaction is carried out for a period of time sufficient to reduce the acid number to a value of less than about 30. This normally requires from 4 to 6 hours, although shorter or longer times can be employed. At the completion of the reaction, the reaction mixture is stripped to remove unreacted starting material, cooled to 100° C. to 110° C., and diluted with vinyl monomer which is ordinarily styrene. An inhibitor such as hydroquinone is preferably added along with or just prior to the addition of the styrene. The inhibitor is employed in customary quantities, e.g., from 0.005 to 0.2 weight percent, based upon total weight of polyester plus styrene. The styrene is employed in conventional amounts, for example, from about 20 to about 40 weight percent, based on weight of styrene plus polyester.

The styrene-modified polyester resin can be cured by the usual procedures. For example, a peroxide can be added to promote the polymerization of the styrene and the maleic residues. An accelerator can also be employed, if desired. Examples of useful peroxides include benzoyl peroxide, t-butyl hydroperoxide, methyl ethyl ketone peroxide, and the like. Useful accelerators include cobalt naphthenate and dimethylaniline.

The styrene-modified polyesters of the invention are useful in the production of laminates, molded articles, cast articles, coatings and the like.

The examples which follow illustrate various aspects of the invention.

EXAMPLE 1

(A) *Phthalic anhydride-propylene glycol-propylene oxide diester-diol*

A phthalic anhydride-propylene glycol-propylene oxide diester-diol was prepared according to the following reactions.

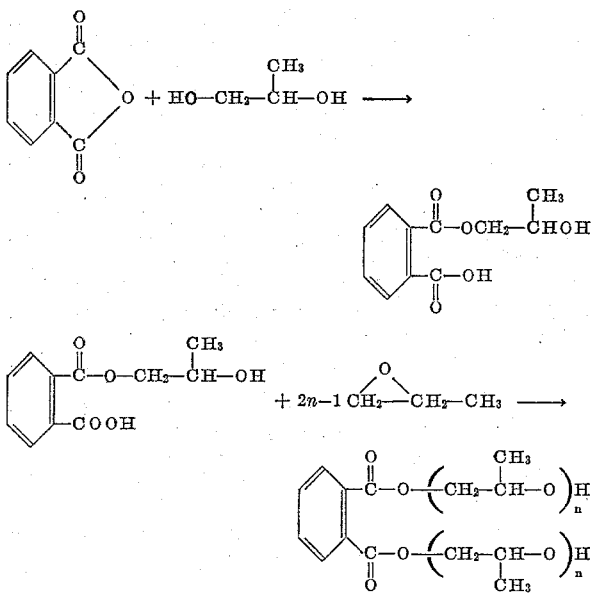

Phthalic anhydride (44.7 moles—6.605 g.) and propylene glycol (44.7 moles—3,395 g.) were added to a 5-gallon stainless steel autoclave and heated for 90 minutes at 120° C. After completion of this reaction (which was indicated by an acid number of 250) an excess of propylene oxide (6,240 g.) was fed into the autoclave (which was held at 120° C.) at a rate of 4 kg./hr. The oxide feed required 1.5 hours and developed only a slight pressure until the reaction was near completion (5925 g. of propylene oxide was added at this point). The system was then maintained at 60 p.s.i. by periodically adding more propylene oxide (315 g.) over an additional 1.5 hours. During both reaction steps cooling was required to prevent the temperature from exceeding 120° C.

After removal of the excess propylene oxide at 50° C./1 mm.:

| | |
|---|---|
| Viscosity at 25° C., cps. | 12,000 |
| Acid number | 4.9 |
| Color, Pt—Co | 20 |
| Specific gravity at 25° C. | 1.179 |
| Refractive index at 25° C. | 1.5063 |
| Equivalent weight (based on hydroxyl analysis) | 166.8 |
| Average $n$ | 1.45 |
| Equivalent weight (based on ester analysis) | 170.5 |
| Average $n$ | 1.51 |
| Propylene glycol, percent | 1.5 |

($n$ refers to the variable in Formula I.)

(B) *Diester-diol maleic anhydride polyester*

A polyester was prepared from the above-diester-diol and maleic anhydride as follows:

A 10% excess of maleic anhydride (486 g., 4.95 moles) was charged with the diester-diol (1504 g., 4.5 moles) in a 5-l., 3-necked flask equipped with a stirrer, thermometer, nitrogen inlet tube and a Dean-Stark trap. The mixture was heated to 200° C. under a nitrogen atmosphere (0.5 l./min./gal.) and agitated at a rate of approximately 230 r.p.m. The reaction mixture was held at this temperature for 6 hours and hydroquinone (0.02%—0.4 g.) was added as an inhibitor to prevent cross-linking of the polyester. During the reaction water and excess maleic anhydride were removed by the Dean-Stark trap and water condenser. The system was then cooled to 100° C. and styrene (860 g.) added to give a 30% systrene solution. The styrene diluted polyester had a viscosity at 25° C., 795 cps.; acid number, 12; Gardner color, 1; specific gravity at 25° C., 1.111 and a refractive index at 25° C.=1.5290.

A resin was prepared by curing the styrene-polyester solution for 2 hours at room temperature and 3 hours at 125° C. in the presence of 1% benzoyl peroxide and 0.1% dimethylaniline. The physical properties of this polyester resin is shown in Table I, below.

EXAMPLE 2

*Diester-diol fumarate polyester*

Fumaric acid (493 g., 4.24 moles) and the diester-diol prepared above (1,456 g., 4.24 moles) were charged to a 5-l., 3-necked flask equipped with a mechanical stirrer, thermometer, nitrogen inlet tube and a Dean-Stark trap. The same procedure was used in the preparation of this polyester as for the diester-diol-maleic anhydride polyester above (B). After the addition of hydroquinone (0.02%, 0.4 g.) and styrene (773 g., 30%) the polyester had a viscosity of 1,312 cps. at 25° C. and an acid number of 28.

This polyester was cured under conditions that were identical to those described above in Example 1. The physical properties of the cured resin are displayed below in Table I.

EXAMPLE 3

*Polyester from monomers*

A polyester was made from phthalic anhydride, propylene glycol and dipropylene glycol to show a comparison between a polyester made from the diester-diol and one made from the monomers. This polyester was made as follows:

Phthalic anhydride (740 g., 0.5 mole), propylene glycol (460 g., 0.6 mole, a 10% excess), dipropylene glycol (604 g., 0.45 mole) and maleic anhydride (490 g., 0.5 mole) were charged to a 5-l., 3-necked flask equipped with a mechanical stirrer, thermometer, nitrogen inlet tube and a Dean-Stark trap. The mixture was heated rapidly to 200° C. under a nitrogen atmosphere (0.5 l./min./gal.) with constant agitation (230 r.p.m.). The temperature was held at 200° C. for 9 hours and hydroquinone (0.02%, 0.46 g.) added. The water and excess propylene glycol were removed during the reaction by the Dean-Stark trap and water condenser. The system was then cooled to 100° C. and styrene (884 g.) added to give a 30% styrene solution. The styrene diluted polyester had an acid number, 30; a viscosity at 25° C., 107 cps. and a Pt—Co color, 30.

Resins were prepared by curing this styrene-polyester solution for 2 hours at room temperature and 3 hours at 125° C. in the presence of 1% benzoyl peroxide and 0.1% dimethylaniline. Table I also summarizes the physical properties of this polyester resin.

In order to compare the properties of the three polyesters prepared in Examples 1-3, representative physical properties were determined. The results are displayed in Table I.

TABLE I. PHYSICAL PROPERTIES OF POLYESTER RESINS

| Property | Example 1 | Example 2 | Example 3 |
|---|---|---|---|
| Heat distortion temp., °C | 82 | 83 | 67 |
| Tensile strength, p.s.i | 9,800 | 10,200 | 10,500 |
| Elongation, percent | 4.6 | 3.4 | 3.75 |
| Modulus of Elast. p.s.i.×$10^5$ | 4.98 | 4.66 | 4.95 |
| Flexural Strength, p.s.i | 15,200 | 16,250 | 17,000 |
| Flexural modulus, p.s.i.×$10^5$ | 4.75 | 4.82 | 4.86 |
| Compressive strength, p.s.i | 17,360 | 16,000 | |
| Flexural Strength after: | | | |
| 72 hour boil in $H_2O$ | 7,000 | 4,107 | 2,400 |
| Retention, percent | 43.1 | 25.3 | 14.0 |
| 72 hour boil in 5% NaOH | 8,400 | 5,540 | 3,900 |
| Retention, percent | 51.9 | 34.1 | 23.0 |

It is noted that the polyesters of the invention (i.e., Examples 1 and 2) have significantly higher heat distortion temperatures and better retention of properties after boiling in water and in aqueous sodium hydroxide when compared with the prior art polyesters (Example 3).

EXAMPLE 4

(A) *Isophthalic acid-propylene oxide diester diol*

An isophthalic acid diester-diol was prepared by charging isophthalic acid (5160 g., 31.0 moles) and propylene oxide (9300 g., 160.0 moles, a 65% excess) to a 5-gallon stainless steel autoclave and heated for 2.5 hours at 145° C. The system developed 200 p.s.i. autogenous pressure during the early stages of the reaction but fell off to 145 p.s.i. when reaction was complete. The reaction was very exothermic and required constant cooling to maintain the temperature at 145° C. When the reaction was complete (acid number <5) the excess propylene oxide was removed by distillation at 50° C./1 mm. to give the diester-diol with the following properties:

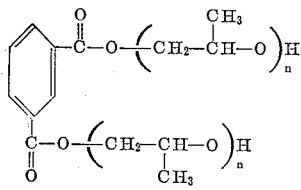

| | |
|---|---|
| Acid number | 3.2 |
| Color, Gardner | <1.0 |
| Viscosity at 25° C. cps | 9,300 |
| Specific gravity at 25° C. | 1,152 |
| Refractive index | 1.5000 |
| Equivalent weight based on hydroxyl analysis | 189.8 |
| Average n (moles of oxide/carboxyl) | 1.84 |
| Equivalent weight based on ester analysis | 195.0 |
| Average n (moles of oxide/carboxyl) | 1.93 |
| Propylene glycol, percent | 0.4 |

(B) *Diester-diol maleic anhydride polyester*

A polyester was prepared from the above diester-diol and maleic anhydride as follows:

A 10% excess of maleic anhydride (422 grams, 4.51 moles) was charged with the diester-diol (1558 g., 4.1 moles) in a 5-l., 3-necked flask equipped with a mechanical stirrer, thermometer, nitrogen inlet tube and a Dean-Stark trap. The mixture was heated at 200° C. under a nitrogen atmosphere (0.5 l./min./gal.) with constant agitation (approx. 230 r.p.m.) for 6 hours. During the reaction water and excess maleic anhydride were removed by the Dean-Stark trap and water condenser. At the end of the reaction hydroquinone (0.02%, 0.4 g.) was added and the polyester cooled to 100° C. Styrene (1330 g.) was then added to give a 40/60 styrene-polyester solution. The styrene diluted polyester had a viscosity at 25° C., 375 cps.; acid number, 18; specific gravity, 1.068; refractive index, 1.5289; Gardner color, 2.

A resin was prepared by curing the styrene-polyester solution for 2 hours at room temperature and 3 hours at 125° C. in the presence of 1% benzoyl peroxide and 0.1% dimethylaniline. The physical properties of this polyester resin are shown in Table II below.

EXAMPLE 5

*Diester-diol fumarate polyester*

Fumaric acid (475 g., 4.1 moles) and the diester-diol of Example 4 (1558 g., 4.1 moles) were cooked for 6 hours at 120° C. under the same conditions as the maleate polyester above (B). The styrene (1256 g.,) diluted polyester has an acid number of 14.8 and a viscosity of 352 cps. at 25° C.

Table I shows the physical properties of the polyester resin (prepared as in Example 4 above).

EXAMPLE 6

*Diester-diol maleic anhydride-propylene glycol polyester*

A polyester from maleic anhydride (784 g., 8.0 moles), propylene glycol (334 g., 4.4 moles, a 10% excess) and the diester diol of Example 4 (1518 g., 4.0 moles) was prepared by the same procedure as described in Example 4. After the addition of styrene (1520 g.) the polyester had a 9.7 acid number and a 450 cps. viscosity at 25° C.

A resin was prepared from this polyester by the procedure shown in Example 4 above. Table II shows the physical properties of the polyester resin.

TABLE II.—PHYSICAL PROPERTIES OF POLYESTER RESINS

| Property | Example 4 | Example 5 | Example 6 |
|---|---|---|---|
| Heat distortion temp., °C | 85 | 86 | 102 |
| Tensile strength, p.s.i | 9,900 | 8,200 | 9,000 |
| Elongation, percent | 3.2 | 5.4 | 3.8 |
| Flexural strength, p.s.i | 16,300 | 14,320 | 14,400 |
| Flexural modulus p.s.i.×$10^5$ | 3.98 | 3.96 | 4.18 |
| Flexural Strength: | | | |
| After: | | | |
| 72 hr. boil in $H_2O$ | 10,700 | 7,400 | 6,390 |
| Retention, percent | 66.0 | 51.7 | 44.5 |
| After: | | | |
| 72 hr. boil in 5% NaOH | 11,200 | 10,830 | 11,060 |
| Retention, percent | 70.0 | 75.6 | 77.0 |

The heat distortion temperatures and the retention of properties after boiling in water and in aqueous sodium hydroxide of the cured polyesters of the invention are significantly better than the polyesters prepared from a one-step reaction of isophthalic acid, maleic anhydride and propylene glycol.

EXAMPLE 7

*Terephthalic acid-propylene oxide diester-diol*

To a 5-gallon autoclave there was added 6150 grams (31.1 moles) of terephthalic acid. Then contents of the autoclave were heated with stirring to a temperature of 145° C., and 13,045 grams (225 moles) of propylene oxide were added over about an eight-hour period during which the temperature was maintained at 145° C.-150° C. A nitrogen atmosphere was maintained in the autoclave during the reaction. At the end of the reaction period, the excess propylene oxide was removed by vacuum distillation, the product was recovered. The diester-diol produce had the following formula and properties:

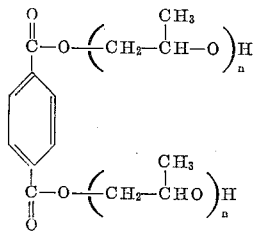

| | |
|---|---|
| Acid number | 0.68 |
| Viscosity at 25° C. cps. | 14,000 |
| Sp. gr at 25° C. | 1.160 |
| Color, Gardner | 16–17 |
| Free propylene glycol Percent by weight | 10.0 |
| Hydroxyl determination, equivalent weight 188.7 | $n=1.82$ |
| Ester determination, equivalent weight 192.5 | $n=1.89$ |

A polyester was produced from 188.7 grams (5 moles) of the above-described diester-diol and 539 grams (5.5 moles) of maleic anhydride. The polyester was diluted with styrene to give a 70 percent solution of polyester in styrene that had an acid number of 16.2 and a viscosity at 25° C. of 5550 centipoises.

One percent benzoyl peroxide was added and the resin was cured at 70° C. for 1 hour and at 125° C. for 3 hours. It had the following properties:

| | |
|---|---|
| Heat distortion temp., ° C. | 70 |
| Tensile strength, p.s.i. | 9,510 |
| Elongation, percent | 3.5 |
| Modulus of elasticity, p.s.i. $\times 10^5$ | 4.61 |
| Flexural strength, p.s.i. | 15,235 |
| Flexurual modulus, p.s.i. $\times 10^5$ | 4.38 |
| Compressive strength, p.s.i. | 15,100 |
| Izod impact, ft.-lbs./in. | 0.18 |
| Barcol (935) hardness | 83 |

EXAMPLE 8

*Phthalic anhydride-diethylene glycol-ethylene oxide diester-diol*

A diester-diol was produced from the following reactants:

| | |
|---|---|
| Phthalic anhydride | 6605 grams, 44.7 moles |
| Diethylene glycol | 4730 grams, 44.7 moles |
| Ethylene oxide | 3150 grams, 71.6 moles |

The procedure was analogous to the one described in Example 1. The reaction of phthalic anhydride and diethylene glycol was carried out at about 120° C. and the oxide addition was carried out at about 80° C. Fifteen grams of sodium hydroxide was employed as a catalyst. The product had the following formula and properties:

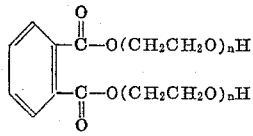

| | |
|---|---|
| Acid number | 0.19 |
| Color | 1–2 Gardner |
| Viscosity at 25° C. cps. | 22,000 |
| Hydroxyl determination, equivalent weight 158.0 | $n=1.67$ |
| Ester determination, equivalent weight 160.6 | $n=1.71$ |

The styrene-modified polyester of the above-described diester-diol has a desirable balance of properties.

EXAMPLE 9

(A) Phthalic anhydride (6,605 g., 44.6 moles), propylene glycol (1018 g., 13.4 moles), dipropylene glycol (4185 g., 31.2 moles) were charged to a 5-gal. stainless steel autoclave and heated for 1.5 hours at 120° C. Propylene oxide (6350 g.) was fed to the autoclave by the same procedure as Example 1A.

After removal of the excess oxide the diester-diol had the following properties:

| | |
|---|---|
| Acid number | 11 |
| Viscosity at 25° C., cps. | 9,100 |
| Color, Pt—Co | 10 |
| Equivalent weight based on hydroxyl analysis | 188.5 |
| $n$ | 1.82 |
| Equivalent weight based on ester analysis | 188.7 |
| $n$ | 1.82 |

(B) *Diester-diol maleic anhydride polyester*

A polyester and polyester resin were prepared from the above diester-diol and maleic anhydride according to the procedures in Example 1B. The charge consisted of 4.67 moles maleic anhydride (458 g., a 10% excess), 4.25 moles diester-diol (1602 g.) 0.41 g. hydroquinone (0.02%) and 764 g. styrene. The styrene diluted polyester had a viscosity at 25° C. of 1,120 cps.; acid number, 14.2 and color, Pt—Co=70–80.

Some physical properties of the polyester resin are as follows:

| | |
|---|---|
| Heat distortion temperature, ° C. | 61 |
| Tensile strength, p.s.i. | 7,570 |
| Elongation, percent | 5.1 |
| Flexural strength, p.s.i. | 14,525 |
| Flexural modulus, p.s.i. $\times 10^5$ | 4.44 |
| Flexural strength: | |
| After 72 hr. boil in $H_2O$, p.s.i. | 4,848 |
| Retention, percent | 33.4 |
| After 72 hr. boil in 5% NaOH, p.s.i. | 4,778 |
| Retention, percent | 32.9 |

What is claimed is:

1. A composition that comprises a styrene solution of a polyester, said polyester consisting essentially of the reaction product of (a) an unsaturated dicarboxylic acid or anhydride thereof and (b) a diester of the formula:

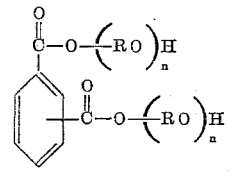

wherein each $n$ individually represents a number having an average value of from about 1.5 to about 2.5, and wherein each R individually represents alkylene of from 2 to 4 carbon atoms, said diester having been previously produced by reacting alkylene oxide with a phthalic acid or a mono(hydroxyalkyl) ester thereof at a temperature below about 160° C.

2. The composition of claim 1 wherein said polyester consists of the reaction product of (a) and (b) as defined in claim 6 and propylene glycol.

3. The composition of claim 1 wherein said olefinically unsaturated dicarboxylic acid is maleic acid.

4. The composition of claim 1 wherein R is ethylene.

5. The composition of claim 1 wherein R is 1,2-propylene.

6. The cured product produced by polymerizing the composition of claim 1.

References Cited by the Examiner

UNITED STATES PATENTS

| | | | |
|---|---|---|---|
| 2,822,350 | 2/1958 | Hayes | 260—861 |
| 3,037,049 | 5/1962 | Vaitekunas | 260—475 |
| 3,060,223 | 10/1962 | McKinney | 260—475 |
| 3,142,733 | 7/1964 | Keck | 260—75 |
| 3,160,679 | 12/1964 | Lew | 260—861 |
| 3,196,131 | 7/1965 | Mayer et al. | 260—861 |

FOREIGN PATENTS 1,323,354   2/1963   France.

MURRAY TILLMAN, *Primary Examiner.*

J. T. GOOLKASIAN, *Assistant Examiner.*